United States Patent Office 3,347,891
Patented Oct. 17, 1967

3,347,891
PROCESS FOR PURIFYING ORGANO-TIN HYDRIDES
Wilhelm Paul Neumann, Giessen (Lahn), and Horst Niermann, Cologne-Stammheim, Germany, assignors to Studiengesellschaft Kohle m.b.H.
No Drawing. Filed Oct. 15, 1963, Ser. No. 316,435
Claims priority, application Germany, Oct. 19, 1962, St 19,869
6 Claims. (Cl. 260—429.7)

The invention relates to a process for purifying organo-tin hydrides of the general formula $$R_mSnH_{4-m}$$

in which R represents an alkyl and/or aryl group and $m$ represents an integer between 1 and 3.

Such compounds are prepared by known processes, for example from organic alkali metal tin hydride compounds by reaction with alkyl halides or from organic tin halides by reduction with lithium-aluminum hydride. It has in addition been proposed to reduce these organic tin halides with sodium hydride combined in complex form, for example by combining aluminum triethyl and sodium hydride in equimolar quantities to form the complex and thereafter adding triethyl-tin chloride.

A process has also already been proposed for reducing alkyl-tin halides with sodium hydride in the presence of small quantities of boron- or aluminum-alkyl compounds as catalysts. A proposal has been made for reducing organo-tin halides with dialkyl aluminum hydrides to the desired organo-tin hydrides.

It is known that the organo-tin compounds produced by these processes are in most cases unstable and are decomposed more or less quickly, often even at 0° C. and in the absence of air, generally within a few days, with discoloration, evolution of hydrogen and deposition of metallic tin. This decomposition reaction is a disadvantage from the point of view of the further utilization of the organo-tin hydrides.

It has now surprisingly been found that the organo-tin hydrides of the general formula $$R_mSnH_{4-m}$$

in which R=alkyl and/or aryl and $m=1$, 2 or 3, can be purified so as not to undergo decomposition if the impurities originating from the production, handling and storage thereof are eliminated by hydrolysis and/or alcoholysis of the undesirable impurities.

As impurities which originate in the production of the organo-tin hydrides and initiate and greatly accelerate the decomposition, Lewis acids are particularly to be mentioned. These impurities are derived from the substances used during the production of the compounds, such as catalysts and reaction components and the conversion products thereof. These consist primarily of organo-aluminum compounds, aluminum-halogen compounds, organo boron compounds, boron-halogen compounds, organo magnesium and other metal compounds having the characteristics of a Lewis acid, such as, for example, the organo-tin halides or the tin-tetrahalides used for the production of the organo-tin hydrides. All these substances occur as impurities in the organo-tin hydrides when using the known methods of production.

It is also possible for these impurities which catalyze the decomposition, to be introduced unintentionally during the handling or storage of the organo-tin hydrides.

These substances causing the decomposition of organo-tin hydrides can be destroyed by hydrolysis and/or alcoholysis and can thus be made harmless.

During the hydrolysis or alcoholysis, acid is generally formed for example from dialkyl-aluminum chloride in accordance with the equation:

$$R_2AlCl+3H_2O \rightarrow Al(OH)_3+2RH+HCl$$

This acid is able in certain circumstances to cause additional reactions, as for example a partial destruction of the organo-tin hydride in accordance with the equation:

$$R_3SnH+HCl \rightarrow R_3SnCl+H_2$$

It has accordingly proved to be advantageous to add an acid-binding agent to the medium being hydrolyzed and/or alcoholyzed. As acid-binding agents, it is possible to use inorganic or organic bases, e.g. ammonia, hydroxides or carbonates of the alkali or alkaline earth metals and organic amines.

The particular advantage of the process according to the invention is primarily that the decomposition of the organic tin compounds is prevented by the purification. In addition other processes which consume time and energy for the working up of the organo-tin hydrides, such as distillation for purification of the compounds, may no longer be necessary.

In order that the invention may be further understood, the following examples are given, by way of illustration only:

Example 1

100 g. of triethyl-tin hydride, prepared in known manner from triethyl-tin chloride and diethyl-aluminum hydride according to the equation $$R_3SnCl+R_2AlH \rightarrow R_3SnH+R_2AlCl$$

and isolated by being directly distilled off from the reaction mixture were vigorously shaken with 10 cc. of a saturated aqueous sodium bicarbonate solution. In this way, any entrained diethyl-aluminum chloride was destroyed. After separation of the aqueous layer, the organic phase was dried with some sodium sulphate. The triethyl-tin hydride, the decomposition of which was otherwise apparent after 2 to 3 days, was capable of being kept for a considerable time without any change after it had been purified.

Example 2

The procedure according to Example 1 was carried out with 150 g. of diethyl-tin dihydride and 20 cc. of a 5% soda solution and the substance was then filtered. The material was thus capable of being stored for at least several weeks.

Example 3

An ethereal solution of diphenyl-tin dihydride, which had been prepared in the known manner from diphenyl-tin dichloride and LiAlH$_4$, and which still contained traces of unreacted diphenyl-tin dichloride, was shaken twice with an aqueous solution which was a 0.1 molar solution of disodium tartrate and an 0.05 molar solution of NaOH. The diphenyl-tin oxide which formed was dissolved in complex form in the aqueous phase and was removed therewith. The purified diphenyl-tin dihydride which was left after the ether had been evaporated off can be kept for weeks on end in the absence of air. Distillation or recrystallization which was previously necessary could be dispensed with.

Example 4

The procedure followed was as indicated in the previous example, but the specific gravity of the aqueous phase was increased by adding a soluble salt such as sodium chloride. By this means, the separation of the two phases was facilitated.

What we claim is:

1. A process for the purification of impurity containing organo-tin hydrides of the formula $$R_mSnH_{4-m}$$

wherein R is selected from the group consisting of alkyl and aryl and $m$ is an integer from 1 to 3, said impurity being a halogen containing compound, which comprises subjecting said hydride to hydrolysis and neutralizing the hydrohalic acid formed thereby.

2. A process according to claim 1 wherein said purification is conducted in the presence of an acid binding agent selected from the group consisting of ammonia, alkali metal and alkaline earth metal hydroxides, carbonates and bicarbonates and organic amines.

3. A process according to claim 2 wherein said acid binding agent is aqueous ammonia.

4. A process according to claim 2 wherein said acid binding agent is soda.

5. A process according to claim 2 wherein said acid-binding agent is sodium bicarbonate.

6. A process according to claim 1 wherein said organo-tin hydride is subjected to hydrolysis.

No references cited.

TOBIAS E. LEVOW, *Primary Examiner.*

HELEN M. McCARTHY, *Examiner.*

W. F. W. BELLAMY, *Assistant Examiner.*